US009244476B2

(12) United States Patent
Ribarich et al.

(10) Patent No.: US 9,244,476 B2
(45) Date of Patent: Jan. 26, 2016

(54) ELECTRONIC BALLAST WITH POWER FACTOR CORRECTION

(71) Applicant: International Rectifier Corporation, El Segundo, CA (US)

(72) Inventors: Thomas J. Ribarich, Laguna Beach, CA (US); Peter Bredemeier, Pr. Oldendorf (DE)

(73) Assignee: Infineon Technologies Americas Corp., El Segundo, CA (US)

( * ) Notice: Subject to any disclaimer, the term of this patent is extended or adjusted under 35 U.S.C. 154(b) by 118 days.

(21) Appl. No.: 13/715,984

(22) Filed: Dec. 14, 2012

(65) Prior Publication Data

US 2013/0229126 A1  Sep. 5, 2013

Related U.S. Application Data

(60) Provisional application No. 61/606,274, filed on Mar. 2, 2012.

(51) Int. Cl.
| | |
|---|---|
| H05B 41/24 | (2006.01) |
| G05F 1/70 | (2006.01) |
| H05B 37/02 | (2006.01) |
| H05B 41/28 | (2006.01) |
| H05B 41/282 | (2006.01) |
| H05B 41/295 | (2006.01) |

(52) U.S. Cl.
CPC *G05F 1/70* (2013.01); *H05B 37/02* (2013.01); *H05B 41/28* (2013.01); *H05B 41/2828* (2013.01); *H05B 41/295* (2013.01); *Y02B 20/186* (2013.01)

(58) Field of Classification Search
CPC .............. H05B 37/02; H05B 41/2824; H05B 41/2828; H05B 41/295; H05B 41/2325; H05B 33/0815; H05B 41/28; H02M 1/425; H02M 1/4241; H02M 7/217; H02M 7/2173; Y02B 70/1441; Y02B 70/145; Y02B 20/348; G05F 1/70
USPC ............. 315/247, 209 R, 291, 289, 244, 307, 315/246, 224, DIG. 7; 363/16, 17, 21.02, 363/21.03
See application file for complete search history.

(56) References Cited

U.S. PATENT DOCUMENTS

| | | | | | |
|---|---|---|---|---|---|
| 5,598,326 | A | * | 1/1997 | Liu et al. | 363/34 |
| 5,939,837 | A | * | 8/1999 | Canova | 315/247 |
| 5,945,783 | A | * | 8/1999 | Schultz | H05B 41/2825 315/219 |
| 6,051,936 | A | * | 4/2000 | Qian | H02M 1/425 315/224 |
| 6,316,883 | B1 | * | 11/2001 | Cho | H05B 41/28 315/209 R |
| 6,617,805 | B2 | * | 9/2003 | Ribarich et al. | 315/247 |

(Continued)

*Primary Examiner* — Haissa Philogene
(74) *Attorney, Agent, or Firm* — Farjami & Farjami LLP

(57) ABSTRACT

According to an exemplary implementation, an electronic ballast includes an input filter coupled to a resonant tank. The resonant tank is configured to generate a resonant current. The input filter is configured to receive an AC input voltage and to generate an AC input current from the resonant current by smoothing the resonant current. The electronic ballast also includes a half-bridge configured to feed the resonant tank so as to generate the resonant current and to receive a supply voltage that is in phase with the AC input voltage. The electronic ballast can also include a controller configured to control a power factor of the electronic ballast by switching the half-bridge. The controller can be configured to adjust a shape of the AC input current by adjusting switching of the half-bridge to thereby adjust a power factor of the electronic ballast.

20 Claims, 4 Drawing Sheets

(56) References Cited

U.S. PATENT DOCUMENTS

| | | | |
|---|---|---|---|
| 6,956,336 B2 * | 10/2005 | Ribarich | 315/247 |
| 7,961,482 B2 * | 6/2011 | Ribarich | 363/21.03 |
| 8,212,492 B2 * | 7/2012 | Lam | H05B 41/28 |
| 8,681,511 B2 * | 3/2014 | Sato | 315/185 S 363/16 |
| 8,760,059 B2 * | 6/2014 | Chou et al. | 315/116 |
| 2014/0145614 A1 * | 5/2014 | Alexandrov | H05B 41/2806 315/85 |

\* cited by examiner

ELECTRONIC BALLAST WITH POWER FACTOR CORRECTION

The present application claims the benefit of and priority to a provisional patent application entitled "Electronic Ballast with Power Factor Correction," Ser. No. 61/606,274 filed on Mar. 2, 2012. The disclosure in that provisional application is hereby incorporated fully by reference into the present application.

BACKGROUND

Electronic ballasts can be utilized to limit current in a circuit. For example, electronic ballasts are commonly utilized to limit current through a fluorescent lamp. By limiting current through the fluorescent lamp, an electronic ballast can prevent the current from rising to levels that may otherwise destroy the fluorescent lamp. Many electronic ballasts require power factor correction (PFC) so that a load, connected to an output of the electronic ballast, appears more like a resistive load (i.e. the electronic ballast has a high power factor).

In order to achieve a high power factor for the electronic ballast, alternating current (AC) input current of the electronic ballast should be substantially in phase with and substantially match a shape of AC input voltage of the electronic ballast. Thus, the PFC may correct for the AC input current being shifted substantially out of phase with the AC input voltage. Furthermore, the PFC may shape the AC input current so as to substantially match a shape of the AC input voltage. PFC is typically achieved in electronic ballasts by utilizing a PFC circuit. The PFC circuit often includes large and expensive power components, which may include diodes, capacitors, and/or transistors.

SUMMARY

An electronic ballast with power factor correction, substantially as shown in and/or described in connection with at least one of the figures, and as set forth more completely in the claims.

DETAILED DESCRIPTION

Figure 1:
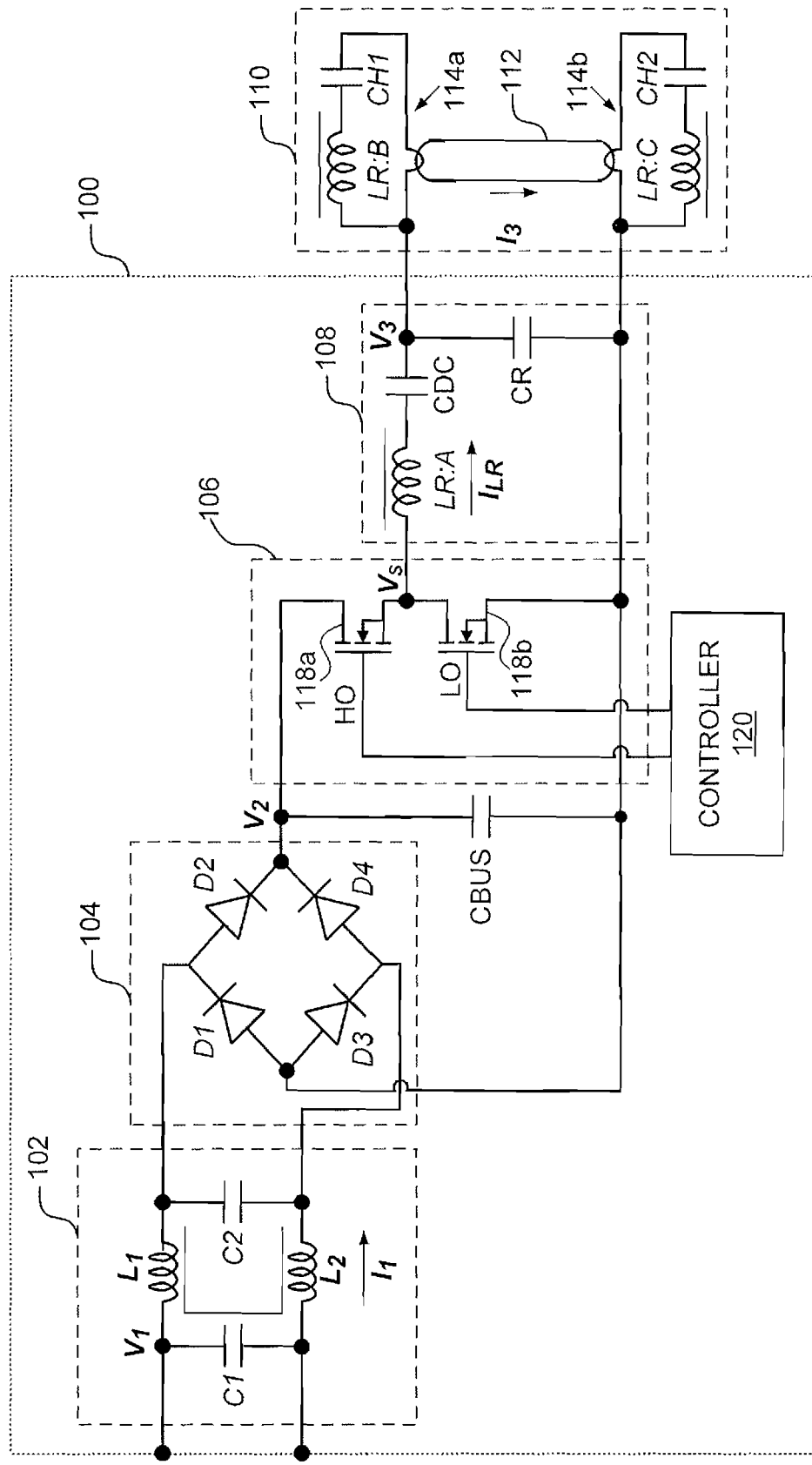
FIG. 1 illustrates a schematic diagram of a circuit of an exemplary electronic ballast coupled to a load.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a schematic diagram of a circuit including electronic ballast 100 coupled to load 110. Electronic ballast 100 includes input filter 102, rectifier 104, half-bridge 106, resonant tank circuit (or simply "resonant tank") 108, and controller 120.

In the implementation shown, input filter 102 is an electromagnetic interference (EMI) filter and includes capacitors C1 and C2 and inductors L1 and L2. Rectifier 104 includes diodes D1, D2, D3, and D4. Half-bridge 106 includes power switches 118a and 118b connected in a totem-pole arrangement. Each of power switches 118a and 118b can be, for example, at least one transistor, such as a metal-oxide-semiconductor field-effect-transistor (MOSFET). In some implementations, the MOSFET is a silicon MOSFET. Resonant tank 108 includes inductor LR:A, DC blocking capacitor CDC and capacitor CR. In the present example, load 110 is a discharge lamp having lamp 112 and filament heating circuits 114a and 114b. Filament heating circuit 114a includes inductor LR:B and capacitor CH1. Filament heating circuit 114b includes inductor LR:C and capacitor CH2.

In some implementations, resonant tank 108 does not include DC blocking capacitor CDC, however, in the present implementation, load 110 is a fluorescent lamp and has DC blocking capacitor CDC to block DC voltage and current to, for example, prevent mercury from migrating to one end of load 110, which can result in end blackening and reduced lifetime.

Electronic ballast 100 has AC input voltage $V_1$, which can be from an AC line input, and is provided to input filter 102. Input filter 102 blocks noise generated by electronic ballast 100. Supply voltage $V_2$ is generated from AC input voltage $V_1$. For example, in the present implementation, rectifier 104 is an AC-DC rectifier that converts AC input voltage $V_1$ to supply voltage $V_2$ for half-bridge 106. In the implementation of FIG. 1, supply voltage $V_1$ is a direct current (DC) supply voltage, in that supply voltage $V_2$ only utilizes a single polarity of voltage. However, supply voltage $V_2$ varies with time. For example, in the present implementation, supply voltage $V_2$ is a full-wave rectified voltage and is a sinusoidal supply voltage. Supply voltage $V_2$ is provided to half-bridge 106 as a high-side input voltage through bus capacitor CBUS. Bus capacitor CBUS is selected such that supply voltage $V_2$ can vary with time, and more particularly, such that supply voltage $V_2$ is a full-wave rectified version of AC input voltage $V_1$. Thus, supply voltage $V_2$ is substantially in phase with AC input voltage $V_1$. In doing so, bus capacitor CBUS cannot be too large, or supply voltage $V_2$ would not be substantially in-phase with AC input voltage $V_1$. For example, if bus capacitor CBUS is too large, supply voltage $V_2$ would be a substantially fixed voltage. In some implementations, bus capacitor CBUS has a capacitance of approximately 0.1 microfarads to approximately 0.22 microfarads, as an example.

An electronic ballast can typically achieve power factor correction by utilizing a PFC circuit. The PFC circuit can load an electrolytic bus capacitor to provide a supply voltage to a half-bridge of a resonant tank as a substantially fixed DC voltage. The electrolytic bus capacitor is electrolytic so as to achieve a sufficient capacitance of for example, 10-22 microfarads, as lower values would cause undesirable oscillation in the supply voltage that is provided to the half-bridge. The aforementioned PFC circuit includes large and costly power components, such as multiple diodes, capacitors, and/or transistors. Furthermore, electrolytic capacitors have a limited lifetime of, for example, 45,000 hours. As such, electrolytic capacitors have been a primary factor limiting the lifetime of electronic ballast circuits.

As described above, in various implementations, such as electronic ballast 100 shown in FIG. 1, for example, bus capacitor CBUS can have a capacitance of approximately 0.1 microfarads to approximately 0.22 microfarads. Thus, electronic ballast 100 does have to include any electrolytic capacitors. For example, bus capacitor CBUS can be a small and inexpensive film capacitor. As such, electronic ballast 100 can have a significantly longer lifetime than other electronic ballast circuits. Additionally, electronic ballast 100 does not require large and expensive power factor correction components by utilizing half-bridge 106 and resonant tank 108 for power factor correction, which is described in further detail below.

Figure 2A:
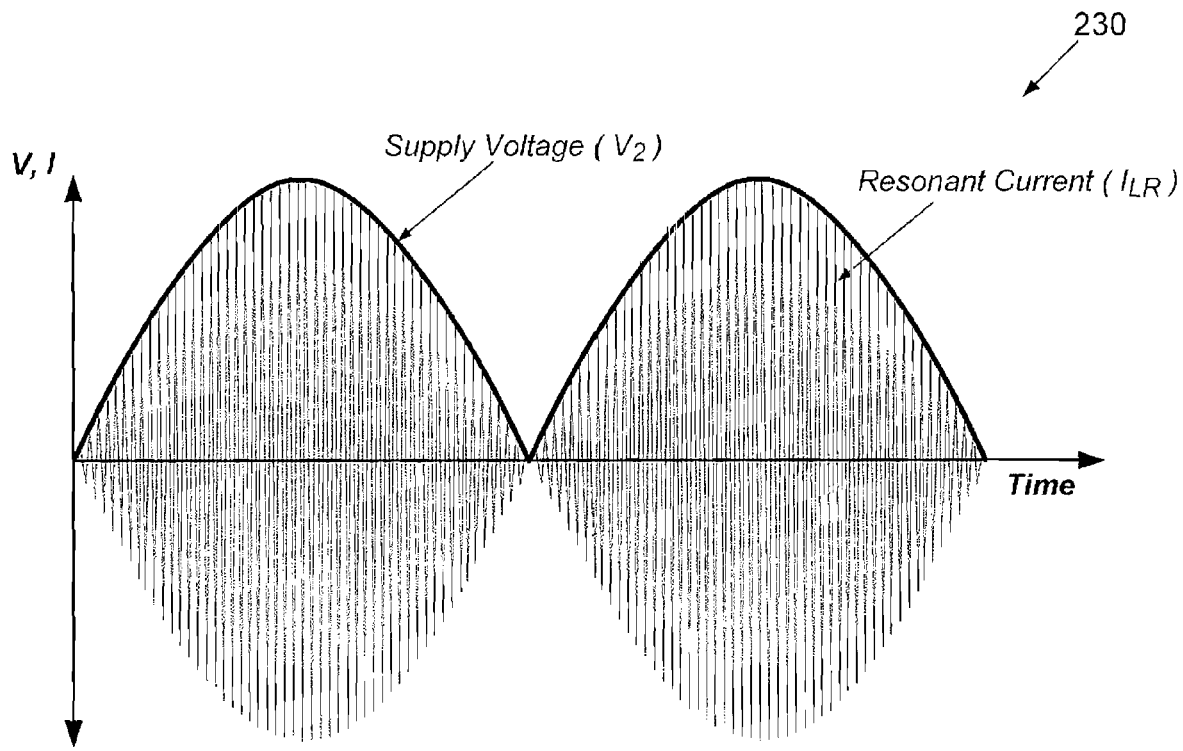
FIG. 2A illustrates an exemplary waveform diagram including a supply voltage of a half-bridge of an electronic ballast as well as resonant current of a resonant tank of the electronic ballast.
Figure 2B:
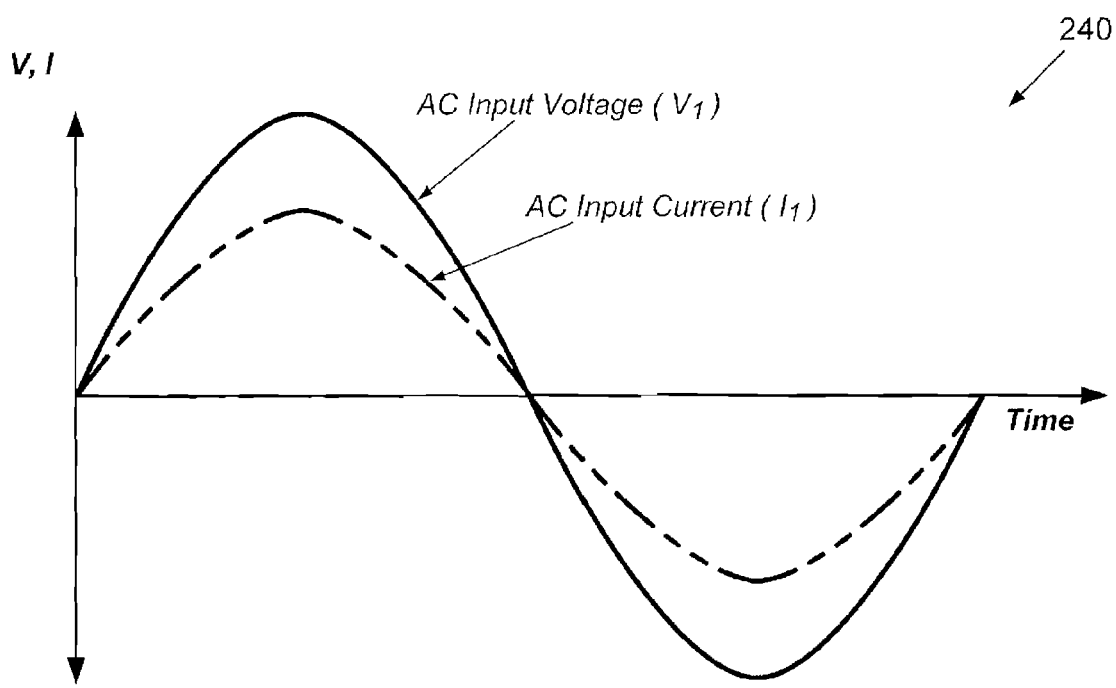
FIG. 2B illustrates an exemplary waveform diagram including an AC input voltage of an electronic ballast as well AC input current of the electronic ballast.

Referring now to FIG. 1 with FIGS. 2A and 2B, FIG. 2A illustrates waveform diagram 230 including supply voltage $V_2$ of a half-bridge of an electronic ballast as well as resonant current $I_{LR}$ of a resonant tank of the electronic ballast. FIG. 2B illustrates waveform diagram 240 including an AC input voltage of an electronic ballast as well AC input current of the electronic ballast. Supply voltage $V_2$, resonant current $I_{LR}$, AC input voltage $V_1$, and AC input current $I_1$ in FIGS. 2A and 2B respectively correspond to supply voltage $V_2$, resonant current $I_{LR}$, AC input voltage $V_1$, and AC input current $I_1$ in FIG. 1.

In order to achieve a high power factor for electronic ballast 100, AC input current $I_1$ of electronic ballast 100 should be substantially in phase with and substantially match a shape of AC input voltage $V_1$ of electronic ballast 100. In electronic ballast 100, input filter 102 is coupled to resonant tank 108. Resonant tank 108 is configured to generate resonant current $I_{LR}$. Input filter 102 is configured to receive AC input voltage $V_1$ and to generate AC input current $I_1$ from resonant current $I_{LR}$ by smoothing resonant current $I_{LR}$. Half-bridge 106 is configured to feed resonant tank 108 so as to generate resonant current $I_{LR}$ and to receive supply voltage $V_2$ that is in phase with AC input voltage $V_1$, as illustrated by FIGS. 2A and 2B. Thus, smoothing of resonant current $I_{LR}$ by input filter 102 results in AC input current $I_1$ being substantially in phase with AC input voltage $V_1$, as shown in FIG. 2B. Thus contributes to a high power factor for electronic ballast 100.

Furthermore, in the present implementation, controller 122 is configured to control power factor of electronic ballast 100 by switching half-bridge 106. More particularly, because electronic ballast 100 does not include a PFC circuit between input filter 102 and half bridge 106, switching half-bridge 106 affects the power factor of electric ballast 100. Thus, for example, controller 120 can be configured to adjust a shape of AC input current $I_1$ by adjusting switching of half-bridge 106 to thereby adjust the power factor of electronic ballast 100, as is the case in the present implementation.

As shown in FIG. 1 controller 120 provides control signals HO and LO respectively to a gate of power switches 118a and 118b. Using control signals HO and LO, controller 120 can control half-bridge output voltage $V_S$ and resonant current $I_{LR}$. For example, controller 120 can control any of the duty cycle, dead time, and switching frequency power switches 118a and 118b to control half-bridge output voltage $V_S$ and resonant current $I_{LR}$. In accordance with various implementations, by controlling any combination of duty cycle, dead time, and switching frequency of power switches 118a and 118b, controller 120 can shape resonant current $I_{LR}$, such that electronic ballast 100 has a high power factor. More particularly, controller 120 can adjust the envelope of resonant current $I_{LR}$ by switching half-bridge 106, which in turn adjusts the shape of AC input current $I_1$ as input filter 102 generates AC input current $I_1$ from resonant current $I_{LR}$ by smoothing resonant current $I_{LR}$.

In FIG. 2A, supply voltage $V_2$ can be, for example, approximately 100 Hz or approximately 120 Hz, which is twice the frequency of AC input voltage $V_1$ clue having been rectified in the implementation described in FIG. 1. Resonant current $I_{LR}$ has an amplitude that rises and falls substantially with the envelope of supply voltage $V_2$ and has a frequency between, for example, approximately 50 kHz to approximately 100 kHz. While FIG. 2A shows resonant current $I_{LR}$ having a substantially fixed frequency, as mentioned above, in accordance with various implementations, by controlling any combination of duty cycle, dead time, and switching frequency of power switches 118a and 118b, controller 120 can shape resonant current $I_{LR}$ and thereby AC input current $I_1$ to thereby adjust a power factor of electronic ballast 100. As one example, controller 120 can increase the switching frequency of half-bridge 106 to provide more power to load 110. In various implementations, controller 120 switches half-bridge 106 such that the power factor is greater than or equal to approximately 0.9.

Figure 3:
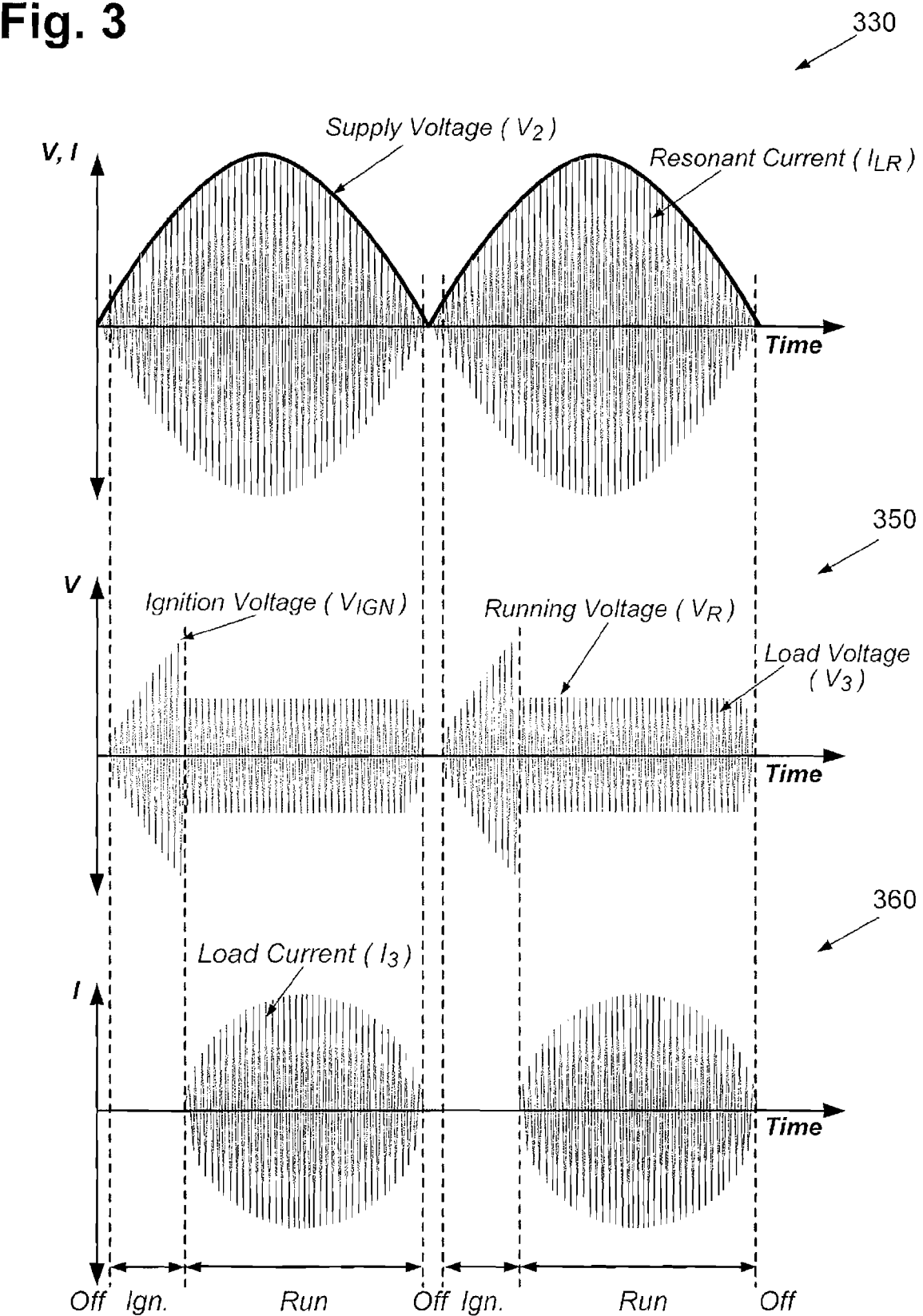
FIG. 3 illustrates various exemplary waveform diagrams of an electronic ballast and a load that is coupled to the electronic ballast.
Figure 4:
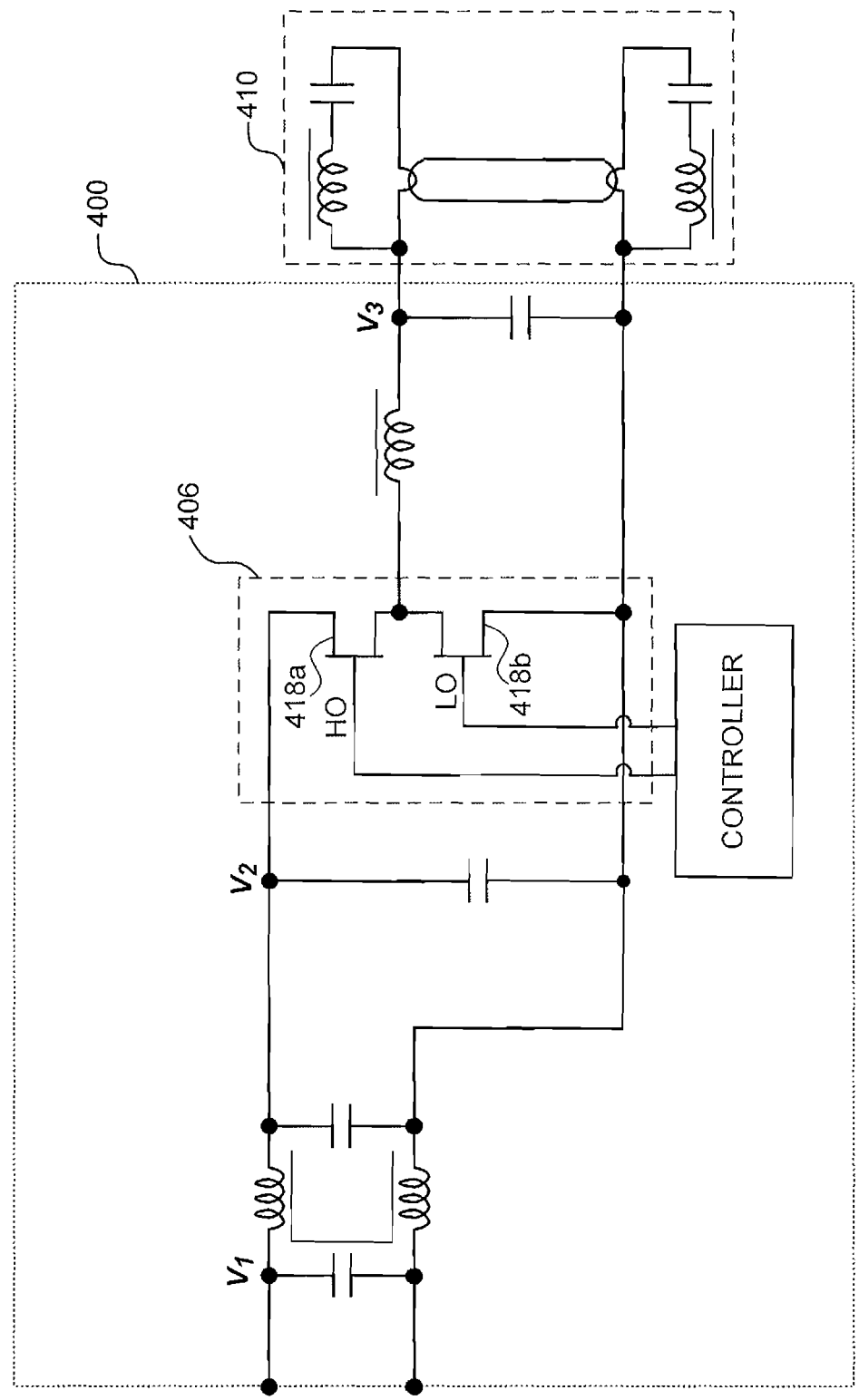
FIG. 4 illustrates a schematic diagram of a circuit including an exemplary electronic ballast coupled to a load.

Turning to FIG. 3, FIG. 3 illustrates waveform diagrams 330, 350, and 360 of an electronic ballast and a load that is coupled to the electronic ballast. In FIG. 4, waveform diagram 330 corresponds to waveform diagram 230 in FIG. 2. Furthermore, supply voltage $V_2$, resonant current $I_{LR}$, load voltage $V_3$, and load current $I_3$ in FIG. 3 correspond to supply voltage $V_2$, resonant current $I_{LR}$, load voltage $V_3$, and load current $I_3$ in FIG. 2. FIG. 3 corresponds to an implementation in which load 110 is a discharge lamp. As such, controller 120 is operable to ignite load 110 in an ignition mode (Ign, in FIG. 3). As illustrated by waveform diagrams 350 and 360, when load voltage $V_3$ reaches ignition voltage $V_{IGN}$, load 110 ignites. Ignition voltage $V_{IGN}$ can be, for example, approximately 300 volts to approximately 400 volts. Subsequently, controller 120 is operable to run load 110 in a run mode (Run in FIG. 3). In the run mode, load voltage $V_3$ is at running voltage $V_R$ which is less than ignition voltage $V_{IGN}$. Running voltage $V_1$ can, for example, be from approximately 100 volts to approximately 200 volts.

As indicated by waveform diagram 330, supply voltage $V_2$, and thus the amplitude of resonant current $I_{LR}$, approaches zero each half-cycle of AC input voltage $V_1$, thereby extinguishing load 110. As such, in some implementations, controller 120 is operable to enter an off mode each half-cycle of AC input voltage $V_1$ (Off in FIG. 3). Waveform diagrams 350 and 360 show that load voltage $V_3$ and load current $I_3$ are substantially zero during each off mode. As such, controller 120 is configured to ignite lamp 110 at least each half-cycle of AC input voltage $V_1$. Furthermore, controller 120 is configured to adjust from ignition voltage $V_{IGN}$ of lamp 110 to running voltage $V_R$ of lamp 110 at least each half-cycle of AC input voltage $V_1$. While load 110 is extinguished at least each half-cycle of AC input voltage $V_1$, load 110 has an ionization time constant that can be, for example, on the order of milliseconds, where its gas atoms (e.g. mercury atoms) recombine. As such, load 110 can remain illuminated even when in an off mode.

Controller 120 can power load 110 using, for example, supply voltage $V_2$ and load current $I_3$. In one implementation, in an ignition mode, when load current $I_3$ reaches a predetermined value, indicating that load 110 has ignited, controller 120 adjusts to a run mode. Also, when supply voltage $V_2$, reaches a predetermined value, for example 40 volts, controller 120 adjust to an off mode until supply voltage $V_2$ reaches another predetermined value, such as 60 volts to enter an ignition mode.

Subsequent ignition modes can use a smaller ignition voltage $V_{IGN}$ and a smaller running voltage $V_R$. Also, controller 120 does not have to behave identically in each ignition mode, run mode, and off mode. For example, in some implementations, controller 120 is configured to select from different run modes and/or utilize different predetermined values to adjust between modes. Some implementations further include submodes of ignition mode, run mode, and off mode and/or additional modes, which are not detailed herein. Furthermore, one or more modes described above may not be included in some implementations. For example, while load 110 has been described as being a discharge lamp, load 110 can be a different type of load. Thus, for example, an ignition mode may not be required to achieve a run mode. For example, each off mode can be immediately followed by a run mode, which is then followed by another off mode.

In some implementations, load 110 includes at least one LED powered by AC from electronic ballast 100. For example, load 110 can be a string of LEDs in parallel with resonant tank 108 and more particularly, in parallel with capacitor CR. In one implementation, at least two strings of LEDs are in parallel with resonant tank 108. Also, in some implementations, the at least two strings of LEDs are antiparallel with one another. As load current $I_3$ is AC, load current $I_3$ flows through one of the at least two stings of LEDs when load current $I_3$ is positive and load current $I_3$ flows through the other of the at least two stings of LEDs when load current $I_3$ is negative. In some implementations, load 110 includes an AC-DC conversion circuit. For example, the AC-DC conversion circuit can include a rectifier and smoothing filter connected to resonant tank 108 to provide DC voltage and DC current.

Referring now to FIG. 4, FIG. 4 illustrates a schematic diagram of a circuit including electronic ballast 400 coupled to load 410. Load 410 corresponds to load 110 in FIG. 1. Electronic ballast 400 can be substantially similar to electronic ballast 100 in FIG. 1. However, in contrast to half-bridge 106 of FIG. 1, electronic ballast 400 includes bidirectional half-bridge 406.

In bidirectional half-bridge 406, power switches 418a and 418b are each bidirectional switches. In some implementations, power switches 418a and 418b each include at least two MOSFETs in source-to-source or drain-to-drain arrangement (not detailed in FIG. 4). In some implementations, power switches 418a and 418b are each bidirectional power transistors, such as high electron mobility transistors (HEMTs). For example, power switches 418a and 418b can each be a group III-Nitride HEMT, such as a GaN HEMI.

Due to the bidirectional nature of bidirectional half-bridge 406, supply voltage can be an AC supply voltage, as is the case in FIG. 4. As shown in FIG. 4, electronic ballast 400 does not require an AC-DC rectifier and DC blocking capacitor, such as rectifier 104 and DC blocking capacitor CDC in FIG. 1. Thus, electronic ballast 400 can have fewer components thereby reducing cost and complexity of electronic ballast 400. Electronic ballast 400 can convert AC input voltage $V_1$ into load voltage $V_3$ without requiring intermediate DC conversion. In contrast, typical PFC circuits are not compatible with a bidirectional half-bridge and thus require intermediate DC conversion. Electronic ballast 400 can otherwise be similar to electronic ballast 100 of Flame 1.

Thus, as described with respect to FIGS. 1, 2A, 2B, 3 & 4, various implementations of the present disclosure can provide for an electronic ballast having a high power factor where AC input current of the electronic ballast can be substantially in phase with and substantially match a shape of AC input voltage of the electronic ballast. This may be achieved without requiring a PFC circuit that includes large and expensive power components, such as diodes, capacitors, and/or transistors. Furthermore, in various implementations, the electronic ballast can convert the AC input voltage into load voltage without requiring intermediate DC conversion. Thus, the electronic ballast can avoid additional components and achieve additional cost reduction.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. An electronic ballast comprising:
   an input filter coupled to a resonant tank, said resonant tank configured to generate a resonant current;
   said input filter configured to receive an AC input voltage and to generate an AC input current from said resonant current by smoothing said resonant current;
   a half-bridge configured to feed said resonant tank so as to generate said resonant current and to receive a supply voltage provided through use of a bus capacitor coupled between a high side bus and a low side bus of said half-bridge, said supply voltage being substantially in phase with said AC input voltage;
   said electronic ballast not using a power factor correction circuit.

2. The electronic ballast of claim 1, wherein said smoothing results in said AC input current being substantially in phase with said AC input voltage.

3. The electronic ballast of claim 1, wherein said supply voltage is generated from said AC input voltage.

4. The electronic ballast of claim 1, comprising a controller configured to control a power factor of said electronic ballast by switching said half-bridge.

5. The electronic ballast of claim 1, comprising a controller configured to adjust a shape of said AC input current by adjusting switching of said half-bridge to thereby adjust a power factor of said electronic ballast.

6. The electronic ballast of claim 1, wherein said half-bridge comprises bidirectional power transistors.

7. The electronic ballast of claim 1, wherein said half-bridge comprises high-electron mobility transistors.

8. The electronic ballast of claim 1, wherein said supply voltage is a DC supply voltage.

9. The electronic ballast of claim 1, wherein said supply voltage is an AC supply voltage.

10. The electronic ballast of claim 1, wherein said supply voltage is a sinusoidal supply voltage.

11. An electronic ballast comprising:
    an input filter coupled to a resonant tank, said resonant tank configured to generate a resonant current;
    said input filter configured to receive an AC input voltage and to generate an AC input current from said resonant current by smoothing said resonant current;

a half-bridge configured to receive a supply voltage provided through use of a bus capacitor coupled between a high side bus and a low side bus of said half-bridge, and to feed said resonant tank so as to generate said resonant current;

a controller configured to control a power factor of said electronic ballast by switching said half-bridge;

said electronic ballast not using a power factor correction circuit.

12. The electronic ballast of claim 11, wherein said controller is configured to adjust a shape of said AC input current by adjusting said switching of said half-bridge to thereby adjust a power factor of said electronic ballast.

13. The electronic ballast of claim 11, wherein said supply voltage is configured to be in phase with said AC input voltage.

14. The electronic ballast of claim 11, wherein said smoothing results in said AC input current being substantially in phase with said AC input voltage.

15. The electronic ballast of claim 11, wherein said controller is configured to ignite a lamp at least each half-cycle of said AC input voltage.

16. The electronic ballast of claim 11, wherein said controller is configured to adjust from an ignition voltage of a lamp to a running voltage of said lamp at least each half-cycle of said AC input voltage.

17. The electronic ballast of claim 11, wherein said power factor is greater than of equal to approximately 0.9.

18. The electronic ballast of claim 11, wherein said half-bridge comprises bidirectional power transistors.

19. The electronic ballast of claim 11, wherein said half-bridge comprises high-electron mobility transistors.

20. The electronic ballast of claim 11, wherein said supply voltage is an AC supply voltage.

* * * * *